2,808,430

REFINING SULFONATES

Moses Robert Lipkin, Havertown, Pa., assignor to Sun Oil Company, Philadelphia, Pa., a corporation of New Jersey No Drawing. Application December 30, 1953,
Serial No. 401,400

4 Claims.  (Cl. 260—504)

This invention relates to the refining of green sulfonic acids and sulfonates obtained by sulfonation of mineral oil.

It is known in the art to produce oil-insoluble, or "green," sulfonic acids by sulfonation of mineral oil with various sulfonating agents such as sulfuric acid, oleum, chlorsulfonic acid, or anhydrous $SO_3$. The color of the green acids produced and salts thereof is frequently unsatisfactory, and a problem is presented with regard to improving the color. In the past, hypochlorite treating agents have been regarded as unsuitable for refining green sulfonates. Thus, in U. S. Patent 2,307,743, issued January 12, 1943, to Liberthson and Blumer, in a disclosure directed to the refining of green sulfonates obtained by sulfonation with fuming sulfuric acid, it is disclosed that alkali metal hypochlorites will not produce a color improving effect of any kind upon green sulfonate stock.

It has now been discovered that a highly advantageous color improving effect can be obtained, by the process of the invention, upon green sulfonic materials and particularly upon those obtained by sulfonation with anhydrous $SO_3$. In the process of the invention, the ratio of the hypochlorous acid or alkali metal hypochlorite reagent on the anhydrous basis to sulfonic acids or sulfonates on the anhydrous basis is within the range from 10 to 50 parts by weight of reagent per 100 parts by weight of sulfonate. Preferably, 15 to 40 parts by weight of reagent per 100 parts by weight of sulfonate are employed.

The temperature of the treatment is preferably within the range from 70° C. to 150° C. when an alkali metal hypochlorite reagent is used; however, lower temperatures can be used satisfactorily when a decomposition catalyst for the hypochlorite reagent is used, e. g., cobalt, nickel, copper, or iron salts, as known in the art for catalyzing hypochlorite decomposition. When a hypochlorous acid reagent is used, e. g. where such reagent is generated by the action of chlorine on water in the presence of green sulfonic acids, lower temperatures can also be used, e. g. room temperature.

The alkali metal hypochlorite reagent can be formed by reaction of chlorine with caustic soda, and this can be carried out in the presence of the green sulfonates. Alkali metal hypochlorite from any other suitable source can also be used.

The following example illustrates the invention:

Green acids were prepared by contacting furfural-refined petroleum lubricating oil with a gaseous mixture of anhydrous $SO_3$ and air under sulfonating conditions and separating the oil-insoluble green acid phase from the oil phase containing mahogany acids. The green acid phase was contacted with caustic soda to convert the acids to sodium sulfonates.

100 parts by volume of a 0.6% solution of the sodium sulfonates in water were intimately admixed with 5 parts by volume of a 5.25% solution of sodium hypochlorite in water, the ratio of sodium hypochlorite to sodium sulfonate on the anhydrous basis thus being about 44 parts by weight per 100, assuming for the purpose of approximation that the solutions have specific gravities of 1. The mixture was maintained at a temperature of about 100° C. for about 30 minutes. At the end of this period, the color of a 0.6% aqueous solution of the sulfonates was only 3NPA, as compared with an NPA color of 5 for a 0.6% aqueous solution of the sulfonates prior to the hypochlorite treatment.

This example shows that the color of green sulfonates obtained by sulfonation with anhydrous $SO_3$ is substantially improved by treatment at 100° C. with 44 parts of a hypochlorite reagent per 100 parts of sulfonates.

In another test, conducted similarly to that described above, but employing only 16 parts of sodium hypochlorite per 100 parts of sodium sulfonate, the color of the green sulfonates was quite substantially improved. When only 12 parts of sodium hypochlorite per 100 were employed, the color improvement was not as great.

The green sulfonic acids treated according to the invention may have been prepared by any suitable method for preparation of green sulfonic acids. Generally, it is preferred to use as sulfonating agent a gaseous mixture containing a minor proportion of gaseous $SO_3$ and a major proportion of a diluent gas or gases, e. g. air, nitrogen, etc. The ratio of $SO_3$ to oil may be for example in the approximate range from 0.1 to 4 moles of $SO_3$ per mole of aromatics in the oil. The temperature of the effluent oil from the sulfonation zone may be for example in the approximate range from 100° F. to 300° F. Preheating of the charge oil is not necessary, though the charge may be preheated if desired. The sulfonation and/or subsequent separation of green acids from oil may be conducted, if desired, in the presence of a diluent, e. g. petroleum naphtha.

The invention claimed is:

1. Method for improving the color of a material selected from the group consisting of green sulfonic acids and green sulfonates which comprises: contacting such material with an aqueous solution of 10 to 50 parts by weight (anhydrous basis) of a reagent selected from the group consisting of hypochlorous acid and alkali metal hypochlorite per 100 parts by weight of said material (anhydrous basis).

2. Method according to claim 1 wherein said reagent is an alkali metal hypochlorite and the temperature of treatment is within the approximate range from 70° C. to 150° C.

3. Method according to claim 1 wherein said sulfonic acids were prepared by sulfonation of mineral oil with anhydrous sulfur trioxide.

4. Method for improving the color of green sulfonates which comprises: contacting alkali metal salts of green sulfonic acids prepared by sulfonation of mineral oil with anhydrous sulfur trioxide, with an aqueous solution of 10 to 50 parts by weight (anhydrous basis) of alkali metal hypochlorite per 100 parts by weight of said salts (anhydrous basis), at a temperature within the range from 70° C. to 150° C.

References Cited in the file of this patent

UNITED STATES PATENTS

| | | |
|---|---|---|
| 1,308,060 | Frasch | July 1, 1919 |
| 2,201,119 | Blumer et al. | May 14, 1940 |
| 2,307,743 | Liberthson et al. | Jan. 12, 1943 |
| 2,333,830 | Toone | Nov. 9, 1943 |